April 9, 1957 J. D. RUSSELL 2,788,114
CONVEYING MACHINE
Original Filed Sept. 30, 1950 2 Sheets-Sheet 1
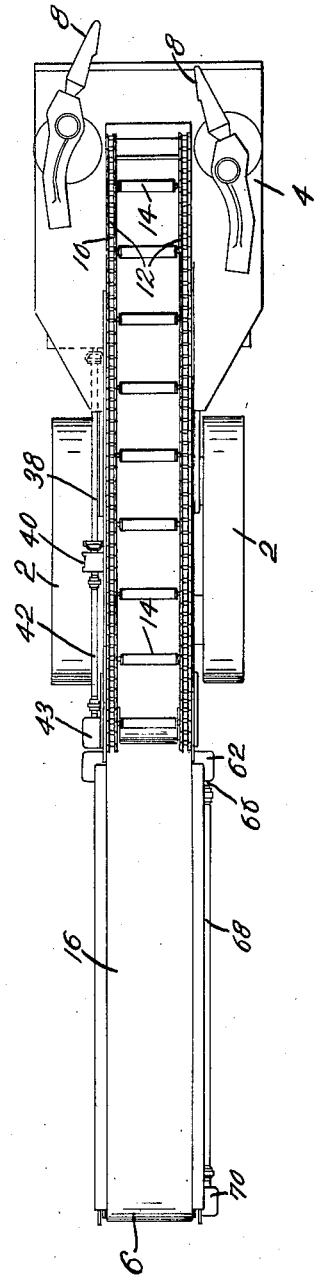
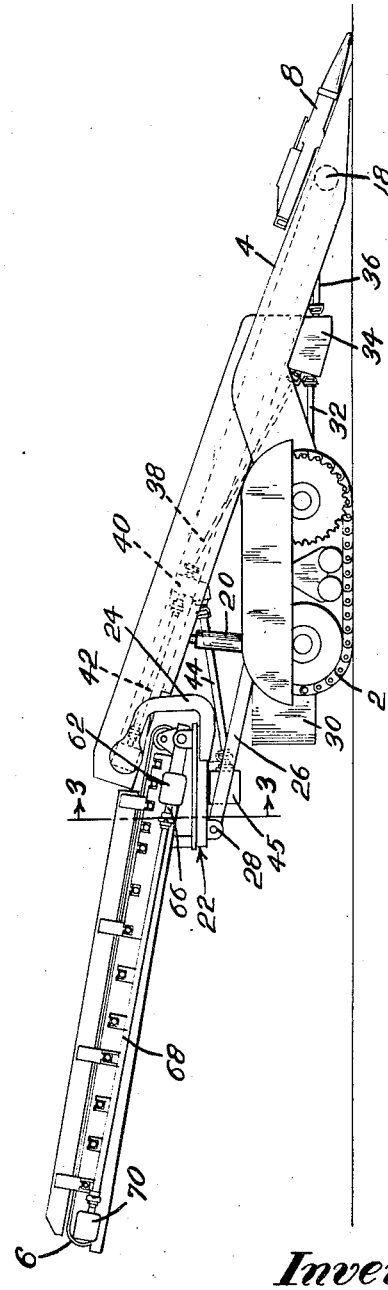
Inventor:
John D. Russell.
By John F. Schmidt
Attorney.

April 9, 1957 J. D. RUSSELL 2,788,114
CONVEYING MACHINE
Original Filed Sept. 30, 1950 2 Sheets-Sheet 2
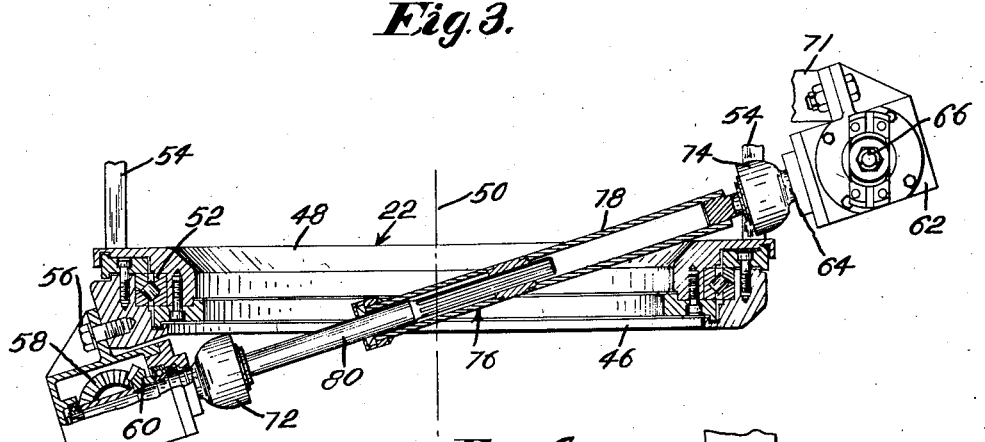
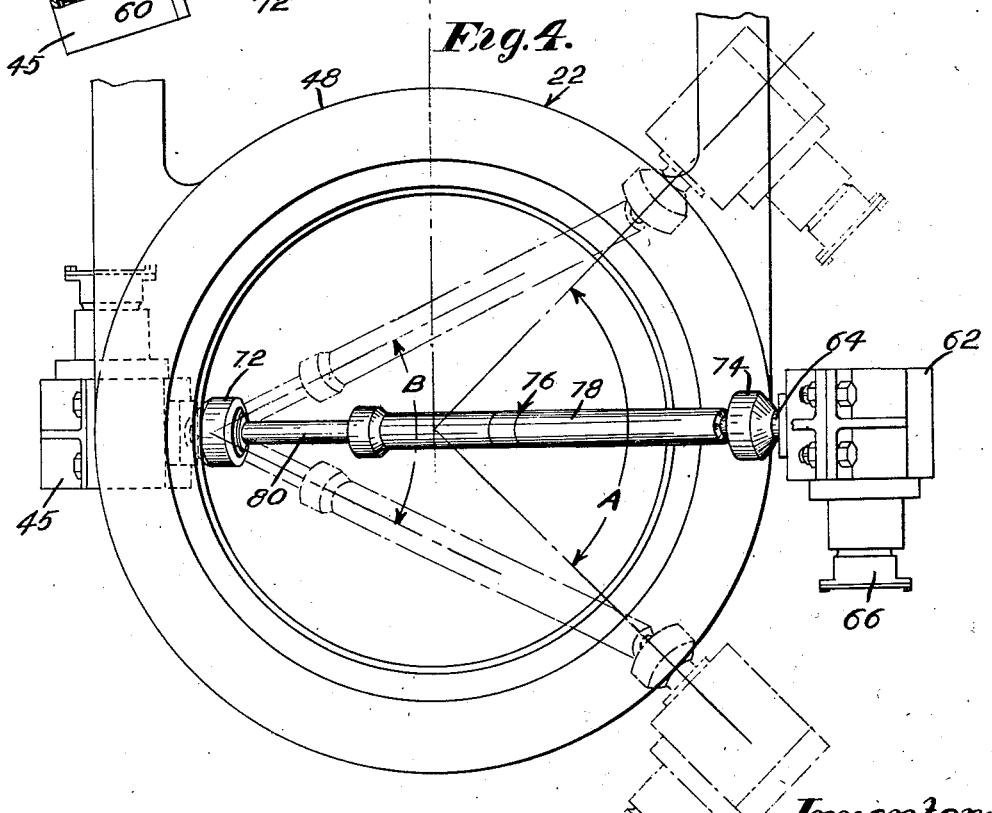
Inventor:
John D. Russell.
by John F. Schmidt
attorney.

United States Patent Office 2,788,114
Patented Apr. 9, 1957

2,788,114

CONVEYING MACHINE

John D. Russell, Franklin, Venango County, Pa., assignor to Joy Manufacturing Company, Pittsburgh, Pa., a corporation of Pennsylvania Continuation of abandoned application Serial No. 187,759, September 30, 1950. This application February 27, 1953, Serial No. 339,201

4 Claims. (Cl. 198—100)

This invention relates to a conveying machine, particularly to a jointed conveying machine having a swingable delivery end, and is a continuation of my application Serial No. 187,759, filed September 30, 1950, and now abandoned.

Mining and quarrying practice of late has required increasingly more mechanization which, in turn, calls for increasingly flexible machines. Thus, a loading machine adaptable to mining and quarrying applications desirably picks loose rock or mineral off the floor and conveys it to some suitable transport mechanism. Thus, the loading machine is necessarily also a conveying machine and is desirably flexible enough to permit considerable movement of the delivery end of the machine without moving the whole machine. Preferably, such a machine requires but one electric motor to perform the several functions required.

Conveyors are desirably driven so that the work run is taut, with the slack appearing in the return run. To accomplish that result, the conveyor must be driven from the discharge end. Where only one electric motor is provided on the machine, means must be provided to transmit power past the joint. A preferred power transmitting means in machines of this type includes universal joints. A possible solution involves the use of one joint, placed at the axis of swing. However, that arrangement limits the swing to the angle permitted by the universal joint, which is undesirably small. That objection is obviated by a drive mechanism involving two universal joints, as in this invention.

It is, accordingly, an object of this invention to provide a conveying machine which is jointed for a maximum of flexibility, and which, moreover, performs under a wide variety of conditions with only a single electric motor to carry out the several functions, including that of driving the conveyor or conveyors from its discharge end. This and other objects are accomplished in a jointed conveying machine having a fixed portion and a swingable portion mounted for swinging movement through a fixed maximum angle, the fixed portion and the swingable portion both being driven (where two separate conveyors are used) from the same single electric motor, the drive for the swingable portion including a shaft which swings through a maximum angle materially less than the aforesaid fixed maximum angle. This arrangement divides the total angle of shaft swing between two universal joints, resulting in a greater maximum arc through which the delivery end of the conveying machine can swing.

In the drawings:

Fig. 1 is a top plan view of a conveying machine made according to this invention.

Fig. 2 is a side elevation view of the machine shown in Fig. 1.

Fig. 3 is a view in section substantially on line 3—3 of Fig. 2 and on a larger scale, showing details of the drive mechanism, and Fig. 4 is a top plan view of the detail shown in Fig. 3.

The invention may be embodied in a loading machine made self-mobile by being mounted on Caterpillar tracks 2 and having a loading head 4 and a discharge end 6. The loading head 4 is provided with loading arms 8 which load ore, rock, or other mineral onto the conveyor which may, if desired, be a single continuous conveyor extending from the loading head to the discharge end and back, and thus spanning both the fixed portion and the swingable portion. In the embodiment here shown, however, the fixed portion and swingable portion actually carry separate conveyors. Thus, the fixed portion carries a fixed conveyor 10, here shown to be of the chain and flight type having side chains 12 and flights 14, and the swingable portion carries a swingable conveyor 16, here shown as a belt type, mounted for swinging about a given axis which is adjacent the upper or discharge end of conveyor 10, and which is of course the swing axis of the swingable portion. Conveyor 10 is hinged at 18 to permit vertical adjustment of the discharge end by means of one or more hydraulic jacks, as for example the hydraulic jack shown at 20.

The swingable conveyor 16 is mounted for substantially horizontal swinging about a turntable indicated generally at 22. The turntable 22 is supported from the upper end of conveyor 10 by means of a pair of depending brackets, one of which is shown at 24, and one or more hinged links such as the one shown at 26. The link or links 26 may be hinged at their right end as seen in Fig. 2 to the carriage of the machine and at the left end to the turntable at 28.

An electric motor 30 is mounted on the carriage of the machine and drives a main shaft 32 which goes to a gear box 34. A shaft 36 extends from the gear box to the drive for the loading arms 8.

A rotatable power shaft 38 connects the gear box 34 with a second gear box 40, with which a drive shaft 42 connects at one end, having its other end connecting with a gear box 43, gear box 43 being connected to drive the fixed conveyor 10. A second drive shaft 44 connects at its one end with gear box 40 and at its other end with a gear box 45.

The swingable conveyor 16 is preferably swingable about a given axis which is the axis of turntable 22. The turntable 22 includes a fixed member 46 which is carried by the fixed conveyor 10 through the brackets 24, and by the carriage of the machine through link or links 26. A rotatable member 48 is mounted for rotation about the given axis 50 on the fixed member 46. Rotation of the member 48 relative to the member 46 is made easy by a roller bearing indicated generally at 52.

The swingable conveyor 16 is mounted on the movable turntable member 48 by means of brackets 54. The gear box 45 referred to above is carried by the fixed conveyor 10 by being mounted on the under side of the fixed turntable member 46 in any suitable manner, as for example by the threaded fastening means 56.

Gear box 45 constitutes a power transmitting member having an input power member or gear 58 and an output power member or gear 60 meshing with gear 58. Still another gear box 62 constitutes a second power transmitting member having an input power member which may for present purposes be considered the shaft 64, and an output power member which may for this purpose be considered the shaft 66. The output power member 66 is, of course, connected to drive the swingable conveyor 16 by means which include a shaft 68 and still another gear box 70. Gear box 62 is carried to move with the movable turntable member 48 through the medium of a bracket 71 secured to the swingable conveyor 16.

Flexible drive means connect the first-named output power member 60 with the second-named input power member 64. These drive means include universal joints 72 and 74 and an extensible drive shaft 76. Drive shaft 76 is a telescoping device having a tubular member 78 adapted to receive a cooperating member 80 which has a splined connection therewith. The member 80 is, of course, connected with the universal joint 72 and the member 78 is connected with the universal joint 74.

As is best seen in Figs. 3 and 4, the output power member 60 is spaced from the aforesaid given axis of rotation 50, and the second-named input power member 64 is also spaced from said given axis. The construction is such that, in at least one operating position of the machine (that in which the conveyors 10 and 16 are alined) the first-named output power member 60 and the second-named input power member 64 are on opposite sides of a longitudinal plane through the given axis 50 and spaced from that plane, "longitudinal" meaning here parallel to the direction of motion of the fixed conveyor, or the fixed portion thereof. In the specific embodiment shown, the power members 60 and 64 are alined in a plane with the given axis 50, the axis 50 lying between the power members 60 and 64, the fixed portion and the swingable portion being alined as seen in Fig. 1.

With this arrangement, the fixed maximum angle of swing of the swingable portion may be comparatively large, while the maximum angle through which the shaft 76 swings is relatively small. Thus, the aforesaid fixed maximum angle through which the swingable conveyor 16 swings is designated A in Fig. 4 and is there shown as being substantially 90°, while the maximum angle of swing through which shaft 76 moves is designated B and is materially less than the angle A, in the construction shown being of the order of magnitude of 52½°.

It is further to be noted that the turntable 22 is disposed in a substantially horizontal plane, with the power transmitting member 44 secured to the underside of the fixed turntable member 46, and the power transmitting member 62 being mounted at the upper side of the movable turntable member 48.

As will be understood by those skilled in the art, suitable means will be provided to swing the swingable portion under the control of a machine operator. Such means form no part of this invention and need not be disclosed here.

*Operation.*—In operation, the loading arms 8 push the ore, rock, mineral or the like onto the fixed conveyor 10 which carries it back and up to discharge onto the swingable conveyor 16. Swingable conveyor 16 may be disposed through a wide angle to locate its discharge end 6 in any position within the range of the maximum angle of swing. Swingable conveyor 16 receives the ore, mineral or the like from conveyor 10 and carries it back to discharge into any suitable transport mechanism.

The electric motor 30 drives the fixed conveyor 10 through a transmission (not shown), through the main shaft 32, gear box 34, rotatable power shaft 38, gear box 40, drive shaft 42 and gear box 43. The drive for the swingable conveyor 16 is through the main shaft 32, gear box 34, rotatable power shaft 38, gear box 40, drive shaft 44, gear box 45, universal joint 72, telescoping shaft 76, universal joint 74, gear box 62, drive shaft 68 and gear box 70.

As the swingable conveyor 16 swings about its given axis 50 through its maximum angle A (Fig. 4) the telescoping shaft 76 also swings through its maximum angle B. The angle B is materially less than the angle A because of the fact that the gear boxes 45 and 62 and their elements are materially spaced from the above-described given axis 50.

It will be evident from the foregoing to those skilled in the art that this invention provides a much improved conveying machine in which two conveyors are joined and are driven from a single power source through an improved drive mechanism. It will be further evident that the invention is applicable to a jointed conveying machine having a fixed portion and a swingable portion spanned by a single conveyor. Other advantages will be apparent to those skilled in the art.

While there is in this application specifically illustrated one form which the invention may assume in practice, it will be understood that this form of the same is shown for purposes of illustration, and that the invention may be modified and embodied in various other forms without departing from its spirit or the scope of the appended claims.

I claim:

1. In a jointed conveying machine having a first conveyor and a second conveyor each with means for moving material longitudinally therealong and connected for relative swing upon a given axis, the improved means for transmitting power from a power driven element on one of said conveyors to a conveyor driving element on the other, including a power driven drive member rotating on an axis fixed relative to said one conveyor, an extensible shaft driven by said power driven drive member, a member driven by said extensible shaft and rotatable upon an axis fixed relative to the other conveyor and connected to drive the material moving means on the latter, said drive member and said driven member at all times at opposite sides of a plane which includes said given axis and which is normal to the longitudinal axis of at least one of said conveyors.

2. In a jointed conveying machine, a first conveyor, a second conveyor, said conveyors having means for moving material longitudinally therealong, means to support the second conveyor for swinging movement about a given axis adjacent one end of the first conveyor, said means including a turntable having a member fixed relative to the first conveyor and a movable member rotatable upon the fixed member about said given axis and fixed to said second conveyor, the improved means for transmitting power from a power driven element on one of said conveyors to a conveyor driving element on the other, including power driven drive members rotating on an axis fixed relative to said one conveyor, an extensible shaft driven by said power driven drive member lying wholly within two parallel planes parallel with the longitudinal axis of said first conveyor and tangent to diametrically opposed points on said turntable and wholly within two parallel planes perpendicular to the first mentioned parallel planes and tangent to said turntable at diametrically opposed points, a member driven by said extensible shaft and rotatable about an axis fixed relative to the other conveyor and connected to drive the material moving means on the latter, said drive member and said driven member at all times at opposite sides of a plane which includes said given axis and which is normal to said first mentioned parallel planes.

3. In a jointed conveying machine, a first conveyor, a second conveyor, means to support the second conveyor for swinging about a given axis adjacent one end of the first conveyor, said means including a turntable having a member fixed relative to the first conveyor and a movable member rotatable on the fixed member about said given axis, means to drive one of said conveyors, an input power member rotatably mounted on one of said members of the turntable, means to drive the input power member, an output power member rotatably mounted on said one turntable member and connected to be driven by the input power member, said output power member being spaced from a plane including said given axis, a second input power member rotatably mounted on the other of said turntable members and opposite the first-named output power member and spaced from said plane whereby the plane lies between the first-named output power member and the second-named input power member, drive means connecting the first-named output power member and the second-named input power member and comprising a pair of universal joints and an extensible shaft, and a second output power member connected to be driven by the second-named input power member and connected to drive the other of said conveyors.

4. A conveying machine as in claim 3, in which the turntable is substantially horizontal, one of the pairs of first-named input and output power members and second-named input and output power members being mounted on the under side of the fixed member of the turntable and the other of the pairs of first-named input and output power members and second-named input and output power members being mounted above the upper side of the movable member of the turntable.

References Cited in the file of this patent

UNITED STATES PATENTS

| | | |
|---|---|---|
| 399,211 | Reeder | Mar. 5, 1889 |
| 984,353 | Cummings | Feb. 14, 1911 |
| 1,818,168 | Smith | Aug. 11, 1931 |
| 2,648,422 | Kling | Aug. 11, 1953 |